(12) United States Patent
Rafferty et al.

(10) Patent No.: US 12,277,543 B2
(45) Date of Patent: Apr. 15, 2025

(54) TONE VERIFICATION OF A PHYSICAL CARD

(71) Applicant: Capital One Services, LLC, McLean, VA (US)

(72) Inventors: Galen Rafferty, Mahomet, IL (US); Samuel Sharpe, Cambridge, MA (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 337 days.

(21) Appl. No.: 17/817,277

(22) Filed: Aug. 3, 2022

(65) Prior Publication Data
US 2024/0046248 A1    Feb. 8, 2024

(51) Int. Cl.
| | |
|---|---|
| *G06Q 20/32* | (2012.01) |
| *G06F 8/65* | (2018.01) |
| *G06F 21/44* | (2013.01) |
| *G06K 7/00* | (2006.01) |
| *G06K 19/04* | (2006.01) |
| *G06K 19/077* | (2006.01) |

(52) U.S. Cl.
CPC .......... *G06Q 20/3278* (2013.01); *G06F 8/65* (2013.01); *G06F 21/44* (2013.01); *G06K 7/0013* (2013.01); *G06K 19/042* (2013.01); *G06K 19/07749* (2013.01)

(58) Field of Classification Search
CPC ............... G06F 21/44; G06K 19/0716; G06K 19/0718; G06K 19/07711; G06K 19/041; G06K 19/0728; G06Q 20/3272
See application file for complete search history.

(56) References Cited

U.S. PATENT DOCUMENTS

| | | | | |
|---|---|---|---|---|
| 5,365,221 A | * | 11/1994 | Fennell ................ | G08B 3/1066 340/636.15 |
| 5,539,819 A | * | 7/1996 | Sonoyama ......... | G06K 19/0728 379/357.03 |
| 5,955,961 A | * | 9/1999 | Wallerstein ........ | G06Q 20/3415 340/5.4 |
| 6,070,794 A | * | 6/2000 | Niwata ................. | G07F 7/1008 235/492 |
| 6,129,277 A | * | 10/2000 | Grant ..................... | G06K 7/084 379/357.01 |
| RE37,660 E | * | 4/2002 | Talton ................... | G07F 7/0866 379/357.01 |
| 6,397,198 B1 | * | 5/2002 | Hoffman ................ | G06Q 30/02 705/64 |

(Continued)

*Primary Examiner* — Daniel I Walsh
(74) *Attorney, Agent, or Firm* — Harrity & Harrity, LLP

(57) ABSTRACT

In some implementations, a card for communicating with a front-end device may include a substrate and an audio generator at least partially embedded in the substrate and configured to generate audio waves. Additionally, the card may include a contact at least partially embedded in the substrate and configured to activate the audio generator and circuitry configured to process an incoming signal from the contact and to transmit an outgoing signal to the audio generator. Additionally, or alternatively, the card may include an output device in lieu of the audio generator. Accordingly, the circuitry may be configured to process an incoming signal from the contact and to transmit an outgoing signal to an audio generator via the output device.

20 Claims, 12 Drawing Sheets

100 ➘

(56) References Cited

U.S. PATENT DOCUMENTS

| | | | | |
|---|---|---|---|---|
| 6,708,892 B2* | 3/2004 | Smith, II | G06K 19/06 | 235/492 |
| 6,885,899 B1* | 4/2005 | Yoon | G06F 3/165 | 381/74 |
| 7,481,363 B2* | 1/2009 | Zuili | G06Q 20/341 | 235/382 |
| 8,281,998 B2* | 10/2012 | Tang | G06Q 20/3278 | 235/493 |
| 8,447,668 B2* | 5/2013 | Jentoft | G07F 7/0886 | 705/35 |
| 9,355,285 B1* | 5/2016 | Wade | G06K 7/10297 | |
| 9,729,691 B2* | 8/2017 | Jeon | H04M 1/656 | |
| 9,898,723 B2* | 2/2018 | Rutherford | G06Q 20/20 | |
| 10,019,707 B1* | 7/2018 | Sangi | G06Q 20/3224 | |
| 10,043,122 B1* | 8/2018 | Koeppel | G06Q 20/352 | |
| 10,108,827 B1* | 10/2018 | Wurmfeld | H04B 5/70 | |
| 10,311,437 B2* | 6/2019 | Tonini | G06Q 20/10 | |
| 11,117,046 B1* | 9/2021 | Denbigh | A63F 3/00643 | |
| 11,176,541 B1* | 11/2021 | Gupta | G06F 3/167 | |
| 11,335,440 B1* | 5/2022 | White | A61B 5/4842 | |
| 11,640,599 B2* | 5/2023 | Gupta | G06Q 20/42 | 705/72 |
| 2002/0047049 A1* | 4/2002 | Perron | G06Q 20/341 | 235/492 |
| 2002/0191765 A1* | 12/2002 | Labaton | G06Q 20/4097 | 379/201.01 |
| 2003/0046554 A1* | 3/2003 | Leydier | G07C 9/257 | 713/186 |
| 2003/0229492 A1* | 12/2003 | Nolan | G10L 17/06 | 704/E17.007 |
| 2004/0026506 A1* | 2/2004 | Finkelstein | G06K 19/06187 | 235/493 |
| 2004/0064573 A1* | 4/2004 | Leaning | H04N 21/4392 | 709/233 |
| 2005/0263596 A1* | 12/2005 | Nelson | G06K 19/0704 | 235/441 |
| 2006/0062407 A1* | 3/2006 | Kahan | H03F 1/52 | 700/94 |
| 2007/0263779 A1* | 11/2007 | Bradley | H04M 1/505 | 379/29.02 |
| 2008/0029608 A1* | 2/2008 | Kellum | G06K 19/07354 | 235/492 |
| 2008/0179403 A1* | 7/2008 | Endlebardt | G06Q 20/327 | 235/492 |
| 2008/0307142 A1* | 12/2008 | Sherman | G06F 13/385 | 710/301 |
| 2010/0029202 A1* | 2/2010 | Jolivet | H02J 50/10 | 713/300 |
| 2010/0106647 A1* | 4/2010 | Raman | G06Q 20/3674 | 380/255 |
| 2010/0201534 A1* | 8/2010 | Busch-Sorensen | G06K 19/07336 | 340/657 |
| 2010/0243732 A1* | 9/2010 | Wallner | G06Q 20/34 | 455/414.1 |
| 2010/0252622 A1* | 10/2010 | Bedore | G06K 7/0008 | 235/492 |
| 2010/0320274 A1* | 12/2010 | Nielsen | G06K 19/07703 | 235/487 |
| 2013/0048712 A1* | 2/2013 | Guillaud | G06K 19/07345 | 235/492 |
| 2013/0048713 A1* | 2/2013 | Pan | G07F 19/207 | 235/379 |
| 2013/0173484 A1* | 7/2013 | Wesby | G06K 7/1417 | 705/318 |
| 2014/0076967 A1* | 3/2014 | Pushkin | G06F 21/35 | 235/380 |
| 2014/0081785 A1* | 3/2014 | Valadas Preto | G06Q 20/341 | 705/41 |
| 2014/0108252 A1* | 4/2014 | Itwaru | G06Q 20/3276 | 705/44 |
| 2014/0258132 A1* | 9/2014 | Swamy | G06Q 20/3278 | 705/67 |
| 2015/0073983 A1* | 3/2015 | Bartenstein | G06Q 20/325 | 705/41 |
| 2016/0098726 A1* | 4/2016 | Karaki | G06Q 20/4097 | 705/44 |
| 2018/0211022 A1* | 7/2018 | Wagner | G06Q 20/40145 | |
| 2018/0373687 A1* | 12/2018 | Pinho | G06F 9/454 | |
| 2019/0013879 A1* | 1/2019 | Webster | H04B 11/00 | |
| 2019/0362336 A1* | 11/2019 | Yim | G06Q 20/353 | |
| 2020/0210994 A1* | 7/2020 | Sauer | G07F 7/0893 | |
| 2021/0003603 A1* | 1/2021 | Jia | G06F 21/34 | |
| 2021/0117553 A1* | 4/2021 | Shpurov | H04L 9/3263 | |
| 2022/0003676 A1* | 1/2022 | Mazed | G01N 21/658 | |
| 2022/0156718 A1* | 5/2022 | Li | G06Q 20/326 | |
| 2023/0074279 A1* | 3/2023 | Spitzer-Williams | G10L 15/26 | |
| 2023/0297980 A1* | 9/2023 | Glaser | G06F 3/016 | 235/492 |

* cited by examiner

TONE VERIFICATION OF A PHYSICAL CARD

BACKGROUND

Physical cards, such as access badges, radio frequency identification (RFID) cards, transaction cards, and other cards, may be used to perform transactions or gain access to a physical or virtual space that is secured.

SUMMARY

Some implementations described herein relate to a card for communicating with a front-end device. The card may include a substrate and an audio generator, the audio generator being at least partially embedded in the substrate and configured to generate audio waves. The card may include a contact at least partially embedded in the substrate and configured to activate the audio generator and circuitry configured to process an incoming signal from the contact and to transmit an outgoing signal to the audio generator.

Some implementations described herein relate to a method of configuring a tone for a card to use with a front-end device. The method may include receiving, from a user device, an indication associated with a sequence of tones. The method may include generating code, executable by circuitry, to instruct an audio generator to generate the sequence of tones. The method may include transmitting, to a communication device, the code for storing on a non-transitory storage at least partially embedded with a substrate of a card.

Some implementations described herein relate to a non-transitory computer-readable medium that stores a set of instructions for verifying a tone from a card for a front-end device. The set of instructions, when executed by one or more processors of the front-end device, may cause the front-end device to receive, at an audio sensor, audio signals in response to a prompt for a tone. The set of instructions, when executed by one or more processors of the front-end device, may cause the front-end device to generate an indication of the audio signals. The set of instructions, when executed by one or more processors of the front-end device, may cause the front-end device to transmit the indication to a remote server. The set of instructions, when executed by one or more processors of the front-end device, may cause the front-end device to receive, from the remote server, a verification of the indication.

DETAILED DESCRIPTION

Figure 1A:
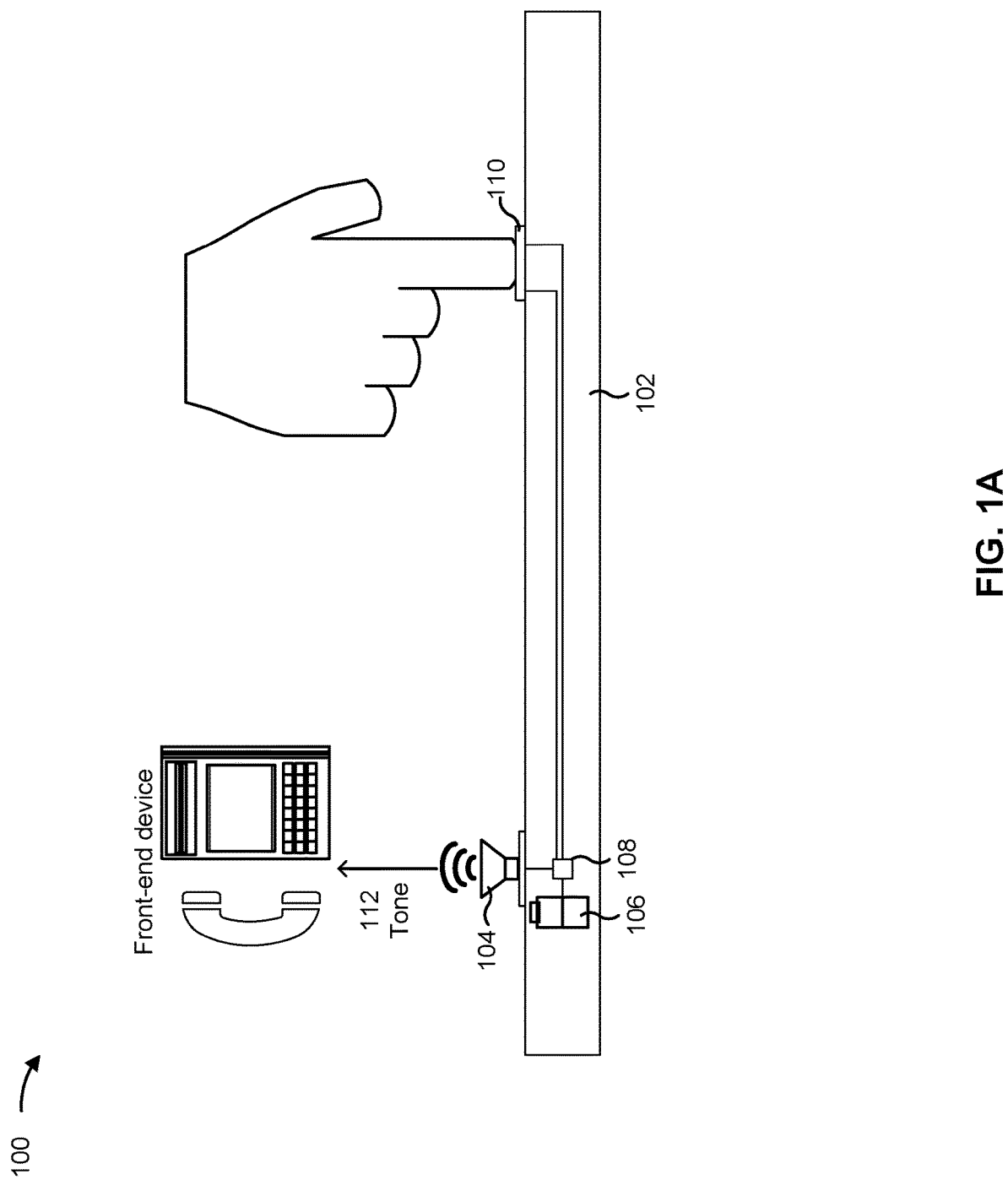
FIGS. 1A-1C are diagrams of an example implementation relating to verifying a physical card using a tone, in accordance with some implementations of the present disclosure.

The following detailed description of example implementations refers to the accompanying drawings. The same reference numbers in different drawings may identify the same or similar elements.

A physical card may be associated with multiple pieces of information that are independently verified in order to confirm that a user, associated with a request for a remote action (e.g., a transaction), has possession of the physical card. For example, a transaction card may be associated with an account number as well as a security code (also referred to as a card verification value (CVV) or a card security code (CSC)). Accordingly, the user's device may encrypt and transmit the account number independently from the security code, which reduces the chances of an attacker obtaining both the account number and the security code without the attacker having possession of the physical card.

However, it is not uncommon for attackers to successfully intercept both account numbers and corresponding security codes. When the attacker uses the card information, the user will use processing resources, power, and network resources in researching to discover the attacker's unauthorized uses and in informing an issuer associated with the card. The issuer will further use processing resources, power, and network resources in investigating the unauthorized uses and remedying the same. Furthermore, each additional portion of information, associated with a physical card, that is independently encrypted and transmitted results in further consumption of power and processing resources, both at the user's device and at a server processing the request for the remote action.

Some implementations described herein provide for a physical card that includes an audio generator (e.g., a speaker) at least partially embedded in a substrate of the card. Accordingly, a user may trigger (e.g., via a contact or via a particular movement of the card, among other examples) the audio generator to generate audio waves, and a front-end device (e.g., a telephone system, a point-of-sale (PoS) terminal, or an automated teller machine (ATM), among other examples) may record the audio waves and verify that the recorded sound is associated with the physical card. Alternatively, the physical card may include an output device (e.g., a port or a wireless transmitter, among other examples) at least partially embedded in the substrate of the card. Accordingly, the user may trigger (e.g., via the contact or via the particular movement of the card, among other examples) the output device to send a signal to an external audio generator (e.g., a speaker) to generate audio waves, and the front-end device may record the audio waves and verify that the recorded sound is associated with the physical card. Because the recorded sound would degrade each time the sound is re-played and re-recorded, attackers are less likely to be able to intercept the recorded sound and use the recorded sound. As a result, security is improved. Alternatively, in some implementations, the front-end device may use properties of the recorded sound (e.g., a spectrogram or Fourier transform coefficients, among other examples) to verify that the recorded sound is associated with the physical card. Accordingly, attackers are not likely to be able to re-create the audio waves based on the properties, which further improves security. Improved security reduces the chances of an attacker using the card information, which conserves processing resources, power, and network resources that the user otherwise would have spent in researching to discover the attacker's unauthorized uses and informing an issuer associated with the card. In turn, processing resources, power, and network resources will be conserved that the issuer otherwise would have spent in investigating the unauthorized uses and remedying the same. Furthermore, by reducing a quantity of information, associated with a physical card, that is independently encrypted and transmitted, power and processing resources are conserved, both at the user's device and at the front-end device.

Figure 1B:
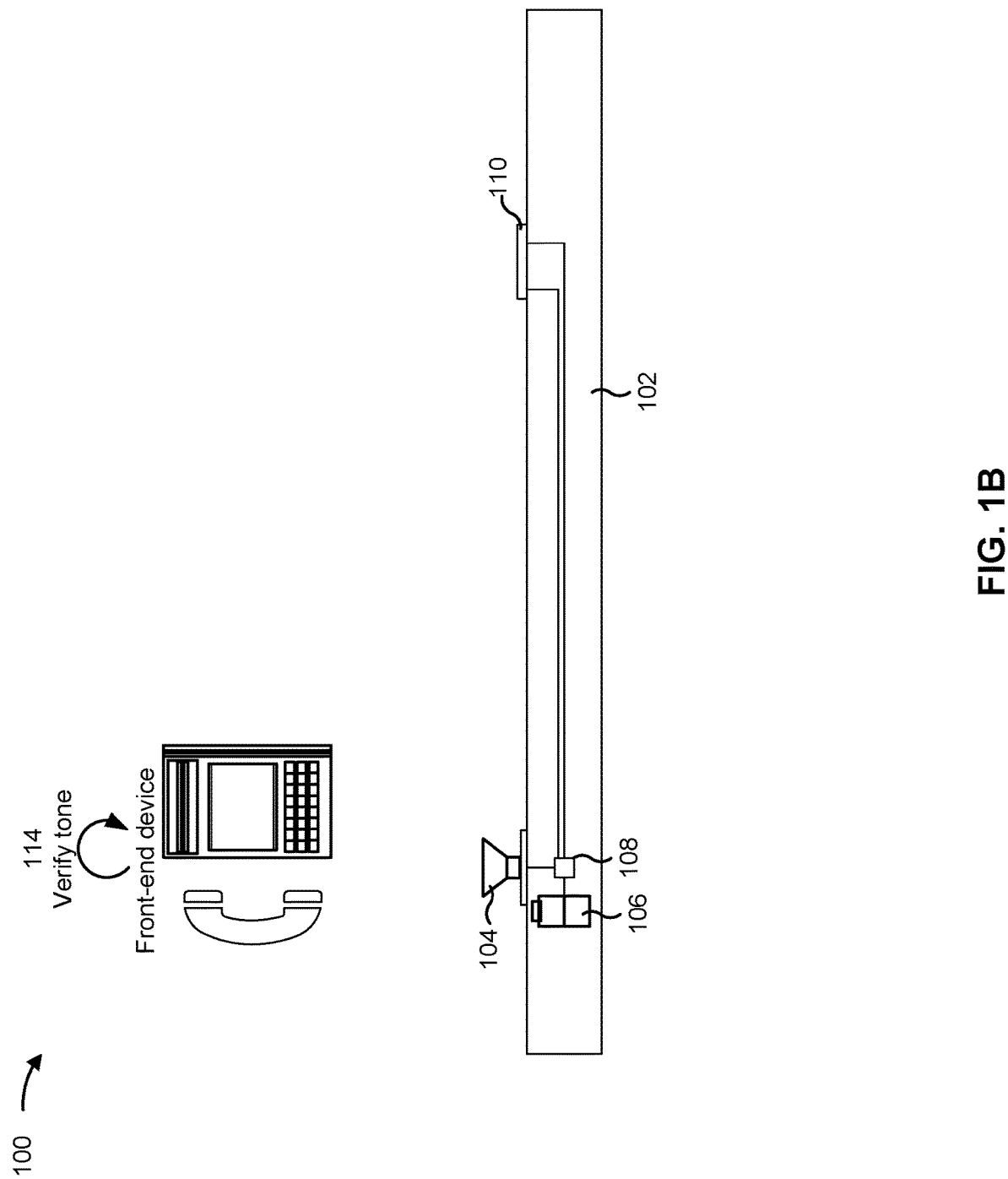
Figure 1C:
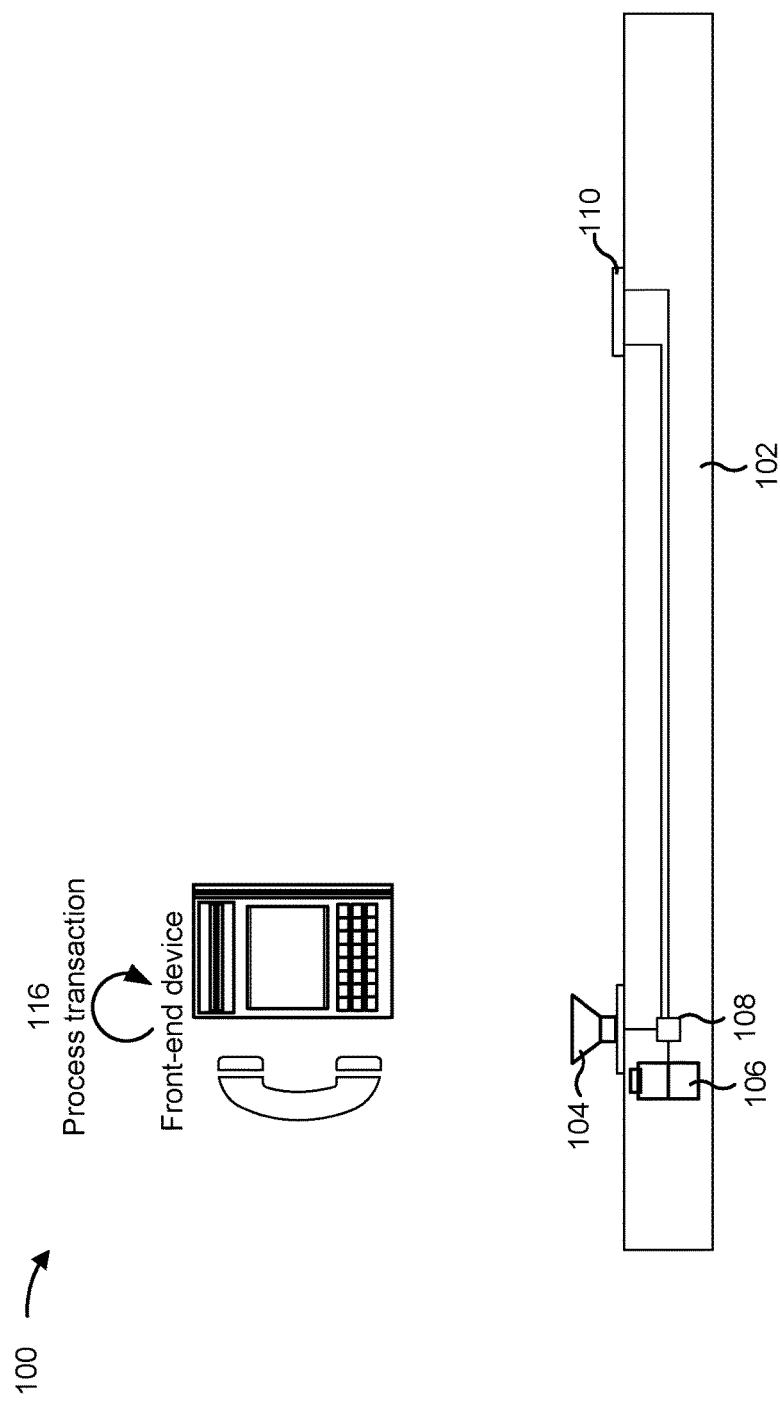

FIGS. 1A-1C are diagrams of an example 100 associated with verifying a physical card using a tone. As shown in FIGS. 1A-1C, example 100 includes a card and a front-end device. These devices are described in more detail in connection with FIGS. 5 and 6.

As shown in FIG. 1A, the card may include a substrate 102. The substrate 102 may include a metal (e.g., a single metal or an alloy), a plastic (e.g., a single plastic or a composite), and/or another type of solid material into which electrical components may be embedded. For example, the substrate may include a hollow cavity or other void into which electrical components are inserted. Accordingly, the substrate may include at least two portions of material that are adhered (e.g., using a glue or other adhesive), melded, or otherwise fused together to enclose the electrical components therein. Additionally, or alternatively, the substrate may be molded or otherwise formed around the electrical components in order to embed the electrical components therein. In some implementations, physical properties of the substrate 102 may be consistent with International Organization for Standardization (ISO) and International Electrotechnical Commission (IEC) standard 7810 (ISO/IEC 7810), ISO/IEC 14443-1, and/or ISO/IEC 7816-1. For example, the substrate 102 may have a width in a range from 15 millimeters (mm) (approximately 0.591 inches (in.)) to 88 mm (approximately 3.465 in.). Additionally, the substrate 102 may have a length in a range from 25 mm (approximately 0.984 in.) to 125 mm (approximately 4.921 in.). The substrate 102 may have a height in a range from mm (approximately 0.027 in.) to 0.84 mm (approximately 0.033 in.).

A user may initiate a request for a remote action using the card. For example, the user may input information associated with the card to the front-end device. Accordingly, the front-end device may verify the information before requesting a remote server to perform the action. In one example, the action may include a transaction using an account associated with the card. In another example, the action may include access (e.g., to a secure virtual space or to a secure physical space) for the user possessing the card. The front-end device may include a telephone system such that the user uses a touch tone pad or the user's voice to transmit information associated with the card to the front-end device. In another example, the front-end device may include a PoS terminal or an ATM such that the user uses a touchscreen or a keyboard to transmit information associated with the card to the front-end device. In yet another example, the front-end device may include a server (e.g., associated with a merchant) hosting a website such that the user uses a browser program to transmit information associated with the card to the front-end device.

The card may include an audio generator 104. For example, the audio generator 104 may include a speaker and/or another type of device that generates audio waves based on electrical signals (whether digital and/or analog). As described below, the audio generator 104 may generate audio waves that the front-end device may record. The front-end device may verify that a user has possession of the card using the recorded audio waves. In some implementations, as further shown in FIG. 1A, the audio generator 104 may be at least partially embedded in the substrate 102.

Additionally, as shown in FIG. 1A, the communication device may include a power source 106. For example, the power source 106 may be a battery or another type of device that stores electrical potential. In some implementations, the card may include a port for charging the power source 106 (e.g., as described in connection with FIG. 4A), and/or the card may include a motion device for converting kinetic energy into electrical energy to charge the power source 106 (e.g., as described in connection with FIG. 4B). Other implementations may include a solar converter for converting sunlight into electrical energy to charge the power source 106 or a radio frequency (RF) device for converting electromagnetic signals into electrical energy to charge the power source 106. The power source 106 provides power for the audio generator 104 and circuitry 108. Accordingly, the power source 106 may have at least one wired connection with the audio generator 104 and at least one wired connection with the circuitry 108. As further shown in FIG. 1A, the power source 106 may be at least partially embedded in the substrate 102.

As further shown in FIG. 1A, the card may include the circuitry 108. The circuitry 108 may include an integrated circuit (IC), such as an application-specific IC (ASIC), configured to process an incoming signal from contact 110 and to transmit an outgoing signal to the audio generator 104. For example, as shown by reference number 112, the audio generator 104 may generate audio waves, and the front-end device may receive (e.g., via a microphone and/or another type of audio sensor) and record (e.g., in an analog and/or digital format) the audio waves. As described below, the audio generator 104 may verify that a user has possession of the card using the recorded audio.

In some implementations, the contact 110 may trigger the incoming signal when activated. The contact 110 may complete an electrical connection when a finger (or other digit) of the user applies pressure to the contact 110. Accordingly, the circuitry 108 may verify that the contact 110 has been connected to the circuitry 108. In some implementations, the circuitry 108 may measure a voltage and/or a current associated with the contact 110. Accordingly, the circuitry 108 may determine that a non-zero current and/or a non-open-circuit voltage differential is present across the contact 110.

In one example, the contact 110 may be positioned between the power source 106 and the circuitry 108 such that the circuitry 108 does not receive electricity from the power source 106 unless the contact 110 is activated. As a result, no additional complexity is added to the circuitry 108. As an alternative, the contact 110 may be included parallel to a closed circuit including the power source 106 and the circuitry 108. Accordingly, the circuitry 108 may include a voltage detector and/or a current detector connected to the parallel circuit including the contact 110. As a result, the circuitry 108 may execute code or other instructions without the user having to keep the contact 110 depressed during an entirety of the execution.

In some implementations, the circuitry 108 may verify that the contact 110 has been activated based on a voltage and/or a current satisfying a threshold (e.g., a voltage threshold and/or a current threshold, respectively). For example, the threshold may be preconfigured based on conductive properties associated with a switch (e.g., the current threshold may be in a range from approximately one ampere to approximately four amperes and/or the voltage threshold may be no more than five volts). The circuitry 108 may be permanently programmed (e.g., via a read-only memory (ROM) or via circuit design) with the voltage threshold and/or the current threshold. Alternatively, different thresholds may be selected as the current threshold and/or the voltage threshold. For example, the circuitry 108 may be reconfigurable (e.g., via a field programmable ROM or via field programmable integrated circuitry, such as a field-programmable gate array (FPGA)) for a new current threshold and/or a new voltage threshold. In some implementations, the circuitry 108 may be reprogrammed via a contact pad (e.g., a metal, such as a single metal or an alloy, and/or another type of conductive material) at the front-end device or at another device electrically connected to the circuitry 108 via the contact pad. Selection of a new current threshold and/or a new voltage threshold may be performed by a user (e.g., via a user device that transmits an indication of the new threshold to a remote server that in turn communicates instructions to reprogram the circuitry 108 to the front-end device and/or another device). Alternatively, selection of a new current threshold and/or a new voltage threshold may be performed by a remote server that communicates instructions to reprogram the circuitry 108 to the front-end device and/or another device (and, in some implementations, transmits an indication of the new threshold to the user device).

In one example, the contact 110 may be a pressure-activated switch associated with a surface that protrudes above a top surface of the substrate 102. Accordingly, the user may visibly see the protruding surface and depress the protruding surface to activate the contact 110. In another example, the contact 110 may be hidden within the substrate 102. For example, the contact 110 may be a pressure-activated switch that is hidden underneath a top surface of the substrate 102 and/or level with the top surface of the substrate 102. Accordingly, the contact 110 does not protrude or otherwise appear readily distinguishable, visually, from the top surface. As a result, security is further improved because a thief does not know where the contact 110 is located, which reduces the chances of the thief using the card and thus conserves processing resources, power, and network resources that the user otherwise would have spent in researching to discover the thief's unauthorized uses and informing an issuer associated with the card. In turn, processing resources, power, and network resources will be conserved that the issuer otherwise would have spent in investigating the unauthorized uses and remedying the same.

As described above, depressing the contact 110 may activate the circuitry 108. The circuitry 108 may include a non-transitory storage with code, executable by the circuitry 108 in response to the incoming signal from the contact 110, to instruct the audio generator 104 to generate a sequence of tones. For example, the circuitry 108 may transmit digital and/or analog signals to the audio generator 104 that are converted into audio waves representing the sequence of tones. Alternatively, the circuitry 108 may transmit electrical commands to a microprocessor of the audio generator 104. The microprocessor may execute a driver for the audio generator 104, and the driver may convert the electrical commands into digital and/or analog signals to the audio generator 104 that are converted into audio waves representing the sequence of tones. Accordingly, the front-end device may receive and record the sequence of tones. In some implementations, the sequence of tones may be within a human hearing range (e.g., in a range from approximately 21 Hz to approximately 19 kHz). Alternatively, the sequence of tones may be supersonic (e.g., in a range from approximately 19 kHz to approximately 21 kHz) or subsonic (e.g., in a range from approximately 1 Hz to approximately 21 Hz). Alternatively to depressing the contact 110, the contact 110 may be a position-activated switch such that the user sliding (or otherwise moving) the contact 110 from a first position to a second position activates the circuitry 108.

In some implementations, the user may depress or slide the contact 110 according to a preconfigured pattern (e.g., a quantity of movements within an amount of time, optionally according to a rhythm). Depressing or sliding the contact 110 may generate a series of electrical signals such that the circuitry 108 may determine when the contact 110 has been moved according to the pattern (within a margin of error) based on the series of electrical signals. Accordingly, the circuitry 108 may instruct the audio generator 104 to generate the sequence of tones based on the determination. In some implementations, the pattern may be reconfigured, similarly as described herein for the sequence of tones. Alternatively to the contract, the card may include an inertial measurement unit (IMU) and/or another similar type of sensor that detects when the user taps the card (e.g., with a finger). Accordingly, when the detected taps on the card match the pattern (within a margin of error), the circuitry 108 may instruct the audio generator 104 to generate the sequence of tones.

Alternatively to tapping the card, the user may draw (e.g., with a finger) a pattern on a surface (or at least a portion of the surface) of the substrate 102. For example, the card may include a set of pressure sensors and/or another similar set of sensors that detects a location of the user's digit on the substrate 102. Accordingly, the user may draw, and the set of sensors may track the user's digit. When the drawing matches the pattern (within a margin of error), the circuitry 108 may instruct the audio generator 104 to generate the sequence of tones. In some implementations, the pattern may be reconfigured, similarly as described herein for the sequence of tones.

Alternatively to depressing or sliding the contact 110, movement of the card according to a preconfigured pattern may activate the circuitry 108. For example, the card may include an IMU and/or another similar type of sensor that tracks motion of the card. Accordingly, the user may move the card (e.g., with a hand of the user), and the IMU may track movement of the card. When the tracked movement of the card matches the pattern (within a margin of error), the circuitry 108 may instruct the audio generator 104 to generate the sequence of tones. In some implementations, the pattern may be reconfigured, similarly as described herein for the sequence of tones.

As shown in FIG. 1B and by reference number 114, the front-end device may verify that the recorded audio is associated with the card. In some implementations, the front-end device may transmit a request for verification of the recorded audio to a remote server (e.g., as described in connection with FIG. 2A). The remote server may be associated with performing the action requested by the user. For example, the front-end device may be configured to contact the remote server to process all card-related requests received at the front-end device. Alternatively, the front-end device may use a data structure to determine to contact the remote server. For example, the data structure may link identifiers of remote servers (e.g., Internet protocol (IP) addresses, hyperlinks, and/or other similar types of identifiers) to corresponding types of cards (e.g., different vendors or manufacturers associated with cards or different account types associated with cards, among other examples). Accordingly, the front-end device may use the information submitted by the user and associated with the card to determine the type of card and use the data structure to identify the remote server to contact.

In some implementations, the front-end device may encrypt and transmit a file (or another type of data wrapper) encapsulating the recorded audio to the remote server. Alternatively, and as described in connection with FIG. 2A, the front-end device may determine properties associated with the recorded audio (e.g., a spectrogram or Fourier transform coefficients, among other examples), and the front-end device may encrypt and transmit a message (or another type of data wrapper) indicating the properties associated with the recorded audio to the remote server. Therefore, the remote server may indicate to the front-end device whether the recorded audio is validly associated with the card (e.g., as described in connection with FIG. 2B).

As shown in FIG. 1C and by reference number 116, the front-end device may perform the requested action based on verifying that the recorded audio is associated with the card. For example, the front-end device may request that the remote server alter data stored on the remote server and associated with the user in order to complete the action (e.g., altering the data to reflect the transaction). Additionally, or alternatively, the front-end device may contact an additional server (e.g., one or more additional servers) via an application programming interface (API) call and/or another communication such that the additional server completes the action. In some implementations, the remote server may transmit, and the front-end device may receive, confirmation that the action was completed. In another example, the front-end device may provide access (or request that connected hardware, such as a turnstile or a door, among other examples, provide access) to a physical space. In yet another example, the front-end device may provide access to information (e.g., over a telephone system) or a virtual space (e.g., a website or a metaverse space, among other examples).

In some implementations, the sequence of tones may be preconfigured. For example, the circuitry 108 and/or the audio generator 104 may be permanently programmed (e.g., via a ROM or via circuit design) with instructions for generating audio waves representing only the preconfigured sequence of tones. As an alternative, the sequence of tones may be configurable. For example, the circuitry 108 and/or the audio generator 104 may be reconfigured (e.g., via a field programmable ROM or via field programmable integrated circuitry, such as an FPGA) to generate audio waves representing a different sequence of tones. In some implementations, the circuitry 108 and/or the audio generator 104 may be reprogrammed via the contact pad described above (e.g., at the front-end device or at another device electrically connected to the circuitry 108 and/or the audio generator 104 via the contact pad). Selection of a new sequence of tones may be performed by a user (e.g., via a user device that transmits an indication of the new sequence of tones to a remote server that in turn communicates instructions to reprogram the circuitry 108 and/or the audio generator 104 to the front-end device and/or another device) as described in connection with FIGS. 3A and 3B. Alternatively, selection of a new sequence of tones may be performed by a remote server that communicates instructions to reprogram the circuitry 108 and/or the audio generator 104 to the front-end device and/or another device (and, in some implementations, transmits an indication of the new sequence of tones to the user device).

Although described with respect to using the audio generator 104 to generate audio waves representing the sequence of tones, other implementations may use an audio generator external to the card. For example, the circuitry 108 may transmit instructions via a port (e.g., as described in connection with FIG. 4A) to an external audio generator (e.g., a smartphone associated with the user or a Bluetooth® speaker associated with the user, among other examples) to generate audio waves representing the sequence of tones. Accordingly, the card may not include the power source 106 because the port may provide power for the circuitry 108 as well as an outlet for the instructions to the external audio generator. Alternatively, the circuitry 108 may transmit instructions via a communication device (such as a wireless transmitter or transceiver) to an external audio generator to generate audio waves representing the sequence of tones. In some implementations, to reduce production time and raw materials used to form the card, the communication device may be a same antenna as is used for wireless communications with the front-end device (e.g., according to ISO/IEC 14443-2 or ISO/IEC 18000).

By using techniques as described in connection with FIGS. 1A-1C, the card generates audio waves representing the sequence of tones, and the front-end device receives and records the sequence of tones. As a result, security is improved because the card cannot be used without the front-end device verifying that the recorded audio is associated with the card. Additionally, because the front-end device does not have to independently encrypt and transmit yet another portion of information associated with the card, the front-end device conserves power and processing resources.

As indicated above, FIGS. 1A-1C are provided as an example. Other examples may differ from what is described with regard to FIGS. 1A-1C.

Figure 2A:
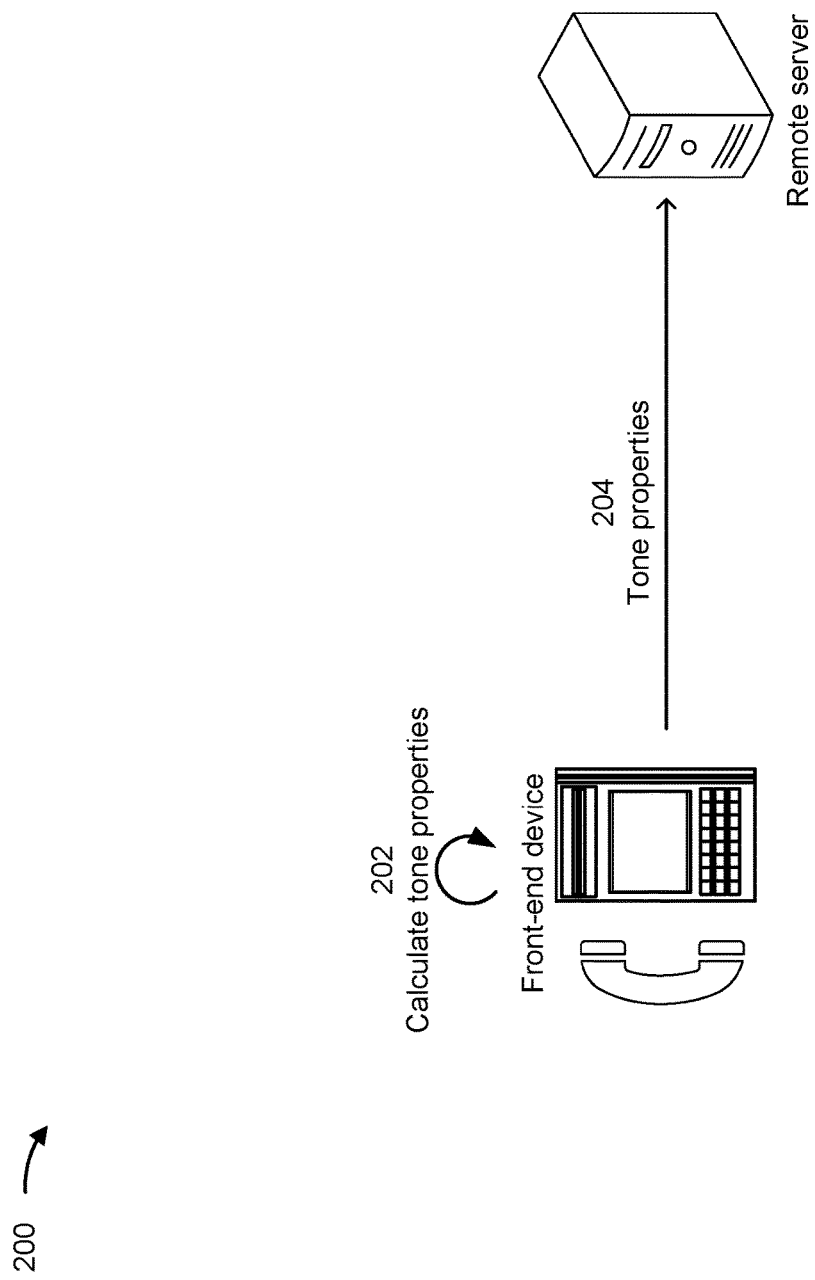
FIGS. 2A-2B are diagrams of an example implementation relating to verifying a tone, in accordance with some implementations of the present disclosure.
Figure 2B:
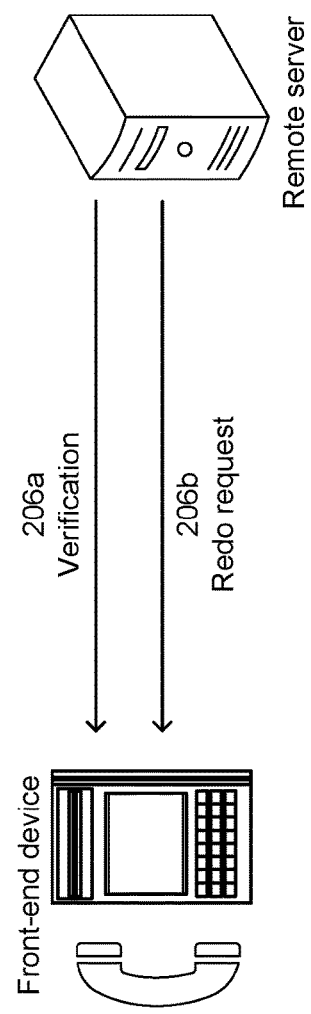

FIGS. 2A-2B are diagrams of an example 200 associated with verifying a tone. As shown in FIGS. 2A-2B, example 200 includes a front-end device and a remote server. These devices are described in more detail in connection with FIGS. 5 and 6.

In example 200, a front-end device may receive (e.g., at an audio sensor, such as a microphone), audio signals in response to a prompt for a tone. For example, the front-end device may prompt a user for the tone, and the user may trigger a card (e.g., as described in connection with FIGS. 1A-1C) to generate the audio signals (or instruct an external audio generator to generate the audio signals). The prompt may include initial audio signals (e.g., voice instructions) generated by a speaker (or another type of audio generator) of the front-end device. The front-end device may generate the prompt in response to a request from the user for a remote action using the card. For example, the user may input information associated with the card to the front-end device. In one example, the action may include a transaction using an account associated with the card (e.g., purchase of a product or service using the card). In another example, the action may include access (e.g., to a secure virtual space or to a secure physical space) for the user possessing the card.

Accordingly, the front-end device may begin recording the audio signals based on an amount of time after the prompt. For example, the front-end device may begin recording based on an amount of time after an end of the prompt satisfying a starting threshold (e.g., 0.5 seconds or 1 second, among other examples). Alternatively, the front-end device may begin recording the audio signals based on a signal that is associated with starting recording. For example, when the front-end device is a telephone system, the user may input a number (or a pound # sign or a star * sign) such that the user's telephone transmits an indication of the input (e.g., a touch tone), to the front-end device, that triggers the front-end device to begin recording. In another example, when the front-end device is a PoS terminal or an ATM, the user may press a key of the front-end device that triggers the front-end device to begin recording.

The front-end device may finish recording the audio signals based on an amount of time after the prompt. For example, the front-end device may finish recording based on an amount of time after an end of the prompt satisfying an ending threshold (e.g., 2 seconds or 4 seconds, among other examples). Alternatively, the front-end device may finish recording the audio signals based on a signal that is associated with terminating recording. For example, when the front-end device is a telephone system, the user may input a number (or a pound # sign or a star * sign) such that the user's telephone transmits an indication of the input (e.g., a touch tone), to the front-end device, that triggers the front-end device to stop recording. In another example, when the front-end device is a PoS terminal or an ATM, the user may press a key of the front-end device that triggers the front-end device to stop recording.

Accordingly, the front-end device may generate an indication of the recorded audio signals. As described in connection with FIG. 1B, the indication may include a file for transmission to the remote server. Alternatively, as shown in FIG. 2A and by reference number 202, the front-end device may calculate properties (e.g., one or more properties) based on the audio signals. For example, the front-end device may calculate a spectrogram, Fourier transform coefficients, a set of frequencies, one or more maximum frequencies, one or more minimum frequencies, a mean frequency, a modal frequency, and/or a frequency range, among other examples. Accordingly, the front-end device may generate a message (e.g., one or more packets) encoding an indication of the properties for transmission to the remote server. The front-end device may transmit, and the remote server may receive, the indication of the recorded audio signals (e.g., the indication of the properties, as shown by reference number 204).

The remote server may thus verify whether the recorded audio signals are associated with the card. For example, the remote server may use a database (or another similar type of data structure) that links digital representations of audio signals to identifications associated with physical cards. In some implementations, the database may be stored locally such that the remote server accesses the database directly. Alternatively, the database may be stored at least partially separately (e.g., logically, virtually, and/or physically) from the remote server such that the remote server transmits a query to the database. The query may include the indication of the recorded audio signals from the front-end device.

The remote server may verify the recorded audio signals when the recorded audio signals match (within a margin of error) a stored digital representation of audio signals in the database. Additionally, the remote server may verify the recorded audio signals when the digital representation of audio signals in the database is linked to an identification of a physical card that matches an identification provided by the front-end device. For example, the identification may include an account identifier or another piece of information associated with the physical card. The front-end device may receive the identification from the user (e.g., with the request for the remote action) and transmit, to the remote server, the identification with the indication of the recorded audio signals or before transmitting the indication of the recorded audio signals to the remote server. Accordingly, the remote server may use the identification as an index such that the remote server determines whether the recorded audio signals match (within a margin of error) the stored digital representation of audio signals associated with the identification in the database.

As shown in FIG. 2B and by reference number 206a, the remote server may transmit, and the front-end device may receive, a verification of the indication. Alternatively, as shown by reference number 206b, the remote server may transmit, and the front-end device may receive, a request to redo the recording. For example, the remote server may determine that the recorded audio signals do not match (at least within a margin of error) any stored digital representation of audio signals in the database. Accordingly, the remote server may request a redo based on the determination. In some implementations, the remote server may determine that the recorded audio signals have too much noise and request a redo based on the determination. For example, the remote server may determine there is too much noise based on a volume level associated with the recorded audio signals satisfying a volume threshold or a Gaussian noise level associated with the recorded audio signals satisfying a noise threshold, among other examples. Alternatively, the remote server may determine there is too much noise based on the recorded audio signals matching a stored digital representation of audio signals in the database but outside the margin of error.

By using techniques as described in connection with FIGS. 2A-2B, the front-end device does not have to independently encrypt and transmit yet another portion of information associated with the card. As a result, the front-end device and the remote server both conserve power and processing resources.

As indicated above, FIGS. 2A-2B are provided as an example. Other examples may differ from what is described with regard to FIGS. 2A-2B.

Figure 3A:
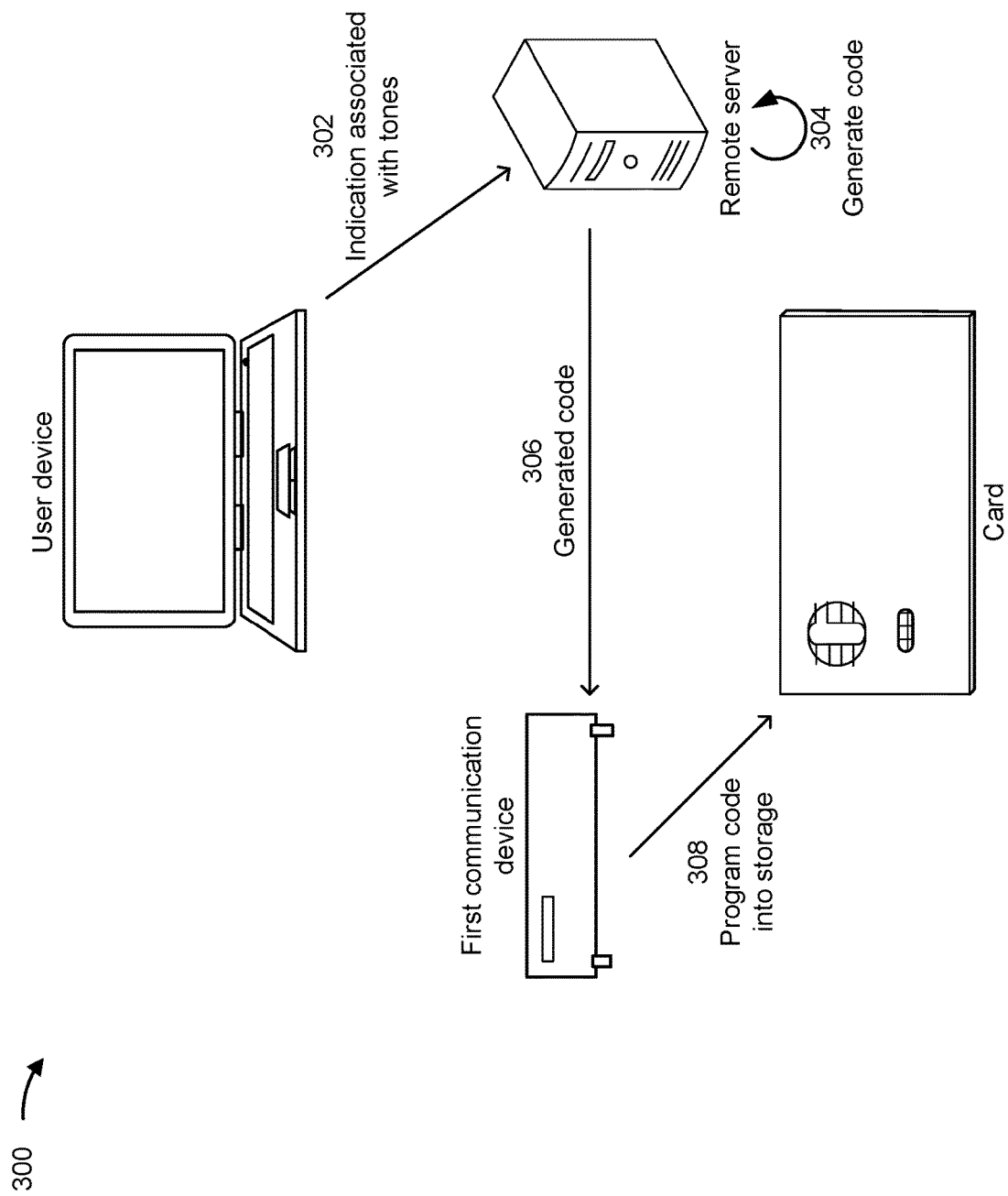
FIGS. 3A-3B are diagrams of an example implementation relating to configuring a tone, in accordance with some implementations of the present disclosure.
Figure 3B:
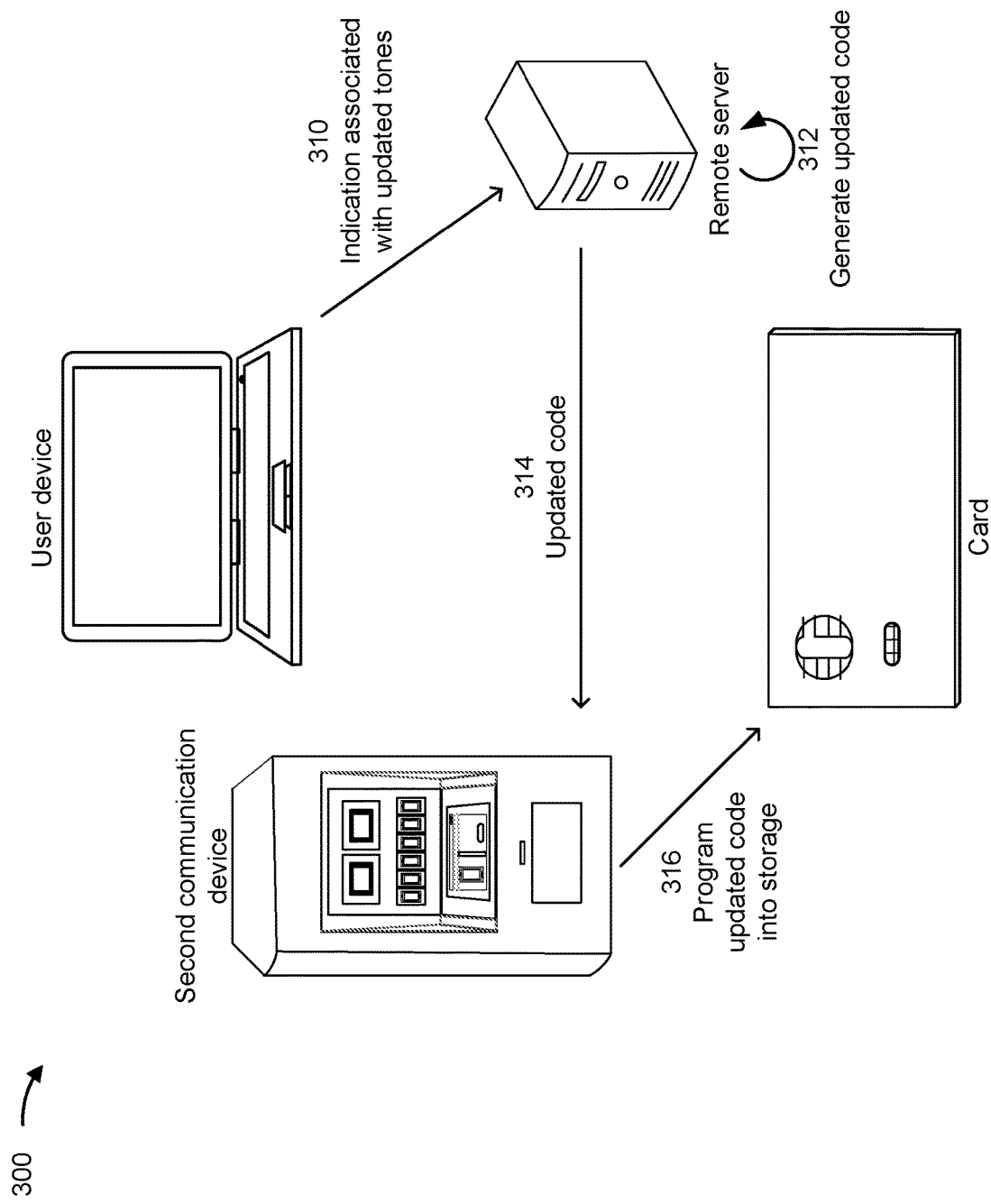

FIGS. 3A-3B are diagrams of an example 300 associated with configuring a tone. As shown in FIGS. 3A-3B, example 300 includes a first communication device (e.g., a first front-end device), a second communication device (e.g., a second front-end device), a user device, and a remote server. These devices are described in more detail in connection with FIGS. 5 and 6.

As shown in FIG. 3A and by reference number 302, the user device may transmit, and the remote server may receive, an indication associated with a sequence of tones. For example, a user may access a website hosted by the remote server through the user device and select the sequence of tones that the user wants to associate with a physical card (e.g., as described in connection with FIGS. 1A-1C). Accordingly, the user device may transmit the indication of the selected sequence of tones to the remote server.

As shown by reference number 304, the remote server may generate code, executable by circuitry (e.g., circuitry 108, as described in connection with FIGS. 1A-1C), to instruct an audio generator (e.g., audio generator 104 or an external audio generator, as described in connection with FIGS. 1A-1C) to generate the sequence of tones. For example, the remote server may generate the code for storing on a non-transitory memory of the card before the card is provided to the user.

In some implementations, the code may include a sequence of low-level instructions based on a configuration of the circuitry and a model of the audio generator. For example, the remote server may access a data structure that associates code templates with different configurations of the circuitry and models of audio generators. The server may modify the code template, associated with the configuration of the circuitry and the model of the audio generator, according to the sequence of tones. The code may include binary code or machine code that is directly executable by the circuitry and/or a driver of the audio generator. Alternatively, the code may include a sequence of high-level instructions for compiling by the first communication device. For example, the code may include C++ code, Python code, Java code, or another type of code that is compiled before being executable by the circuitry and/or the driver of the audio generator.

As shown by reference number 306, the remote server may transmit, and the first communication device may receive, the code. The first communication device may include a device with a wired connection to the circuitry of the card (e.g., via a contact pad or a port). Alternatively, the first communication device may include a device with a wireless connection to a wireless receiver (or transceiver) of the card in communication with the circuitry. The first communication device may be associated with a manufacturer of the card such that the code is initial code for flashing to the non-transitory memory of the card. Accordingly, as shown by reference number 308, the first communication device may program the code into the non-transitory memory of the card.

In some implementations, the circuitry of the code may be reconfigurable. Accordingly, as shown in FIG. 3B and by reference number 310, the user device may transmit, and the remote server may receive, an indication associated with an updated sequence of tones. For example, the user may access the website hosted by the remote server through the user device and select the updated sequence of tones that the user wants to associate with the physical card. Accordingly, the user device may transmit the indication of the updated sequence of tones to the remote server.

As shown by reference number 312, the remote server may generate updated code, executable by the circuitry, to instruct the audio generator to generate the updated sequence of tones. For example, the remote server may generate the code for storing on the non-transitory memory of the card after the user already has possession of the card. The remote server may generate the code in a manner similar to that described above in connection with reference number 304.

As shown by reference number 314, the remote server may transmit, and the second communication device may receive, the updated code. The second communication device may include a device with a wired connection to the circuitry of the card (e.g., via a contact pad or a port). Alternatively, the second communication device may include a device with a wireless connection to a wireless receiver (or transceiver) of the card in communication with the circuitry. The second communication device may be a front-end device (e.g., a PoS terminal or an ATM) such that the updated code is to replace initial code stored in the non-transitory memory of the card. Accordingly, as shown by reference number 316, the second communication device may program the updated code into the non-transitory memory of the card (e.g., when the user presents the card to the second communication device).

As indicated above, FIGS. 3A-3B are provided as examples. Other examples may differ from what is described with regard to FIGS. 3A-3B.

Figure 4A:
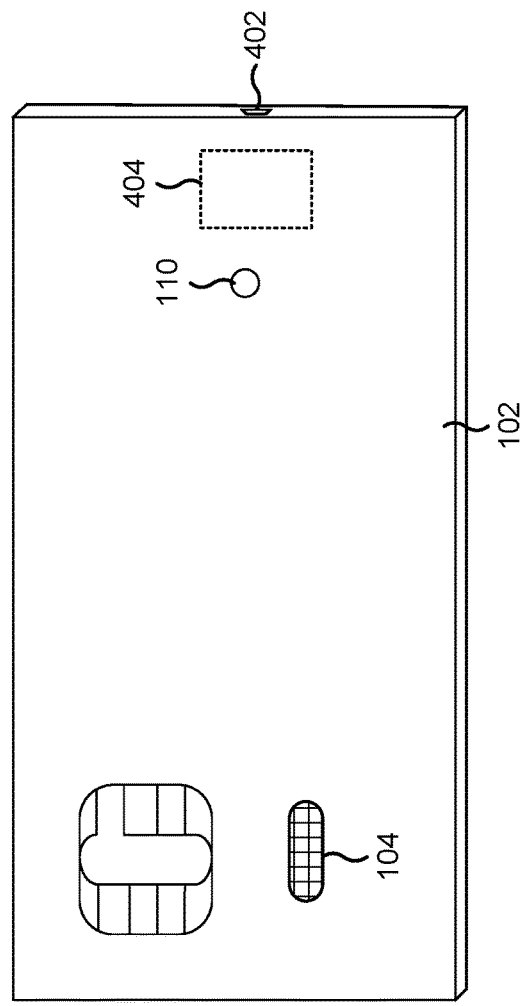
FIGS. 4A-4B are diagrams of an example implementation relating to powering a card, in accordance with some implementations of the present disclosure.
Figure 4B:
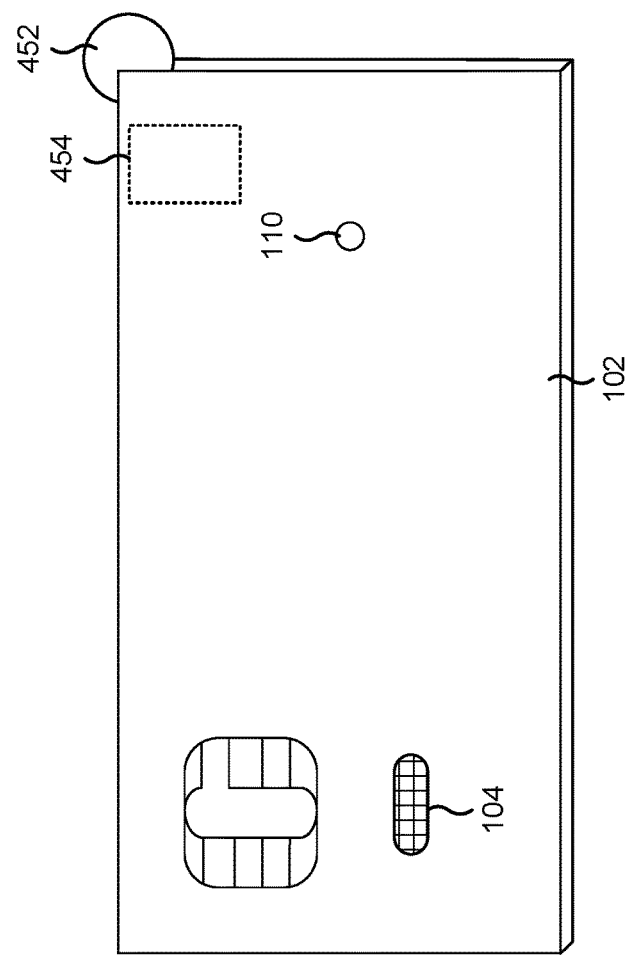

FIGS. 4A and 4B are diagrams of examples 400 and 450, respectively, associated with powering a card. As shown in FIGS. 4A and 4B, examples 400 and 450 each include a substrate 102 with an audio generator 104. Further, examples 400 and 450 each may include a contact 110 and circuitry (not shown), as described in connection with FIGS. 1A-1C.

As shown in FIG. 4A, the card may include a port 402 (e.g., a universal serial bus (USB) port or another type of port). The port 402 may be at least partially embedded on an edge of the substrate 102. Accordingly, the port 402 may be configured to transfer electricity from an external power source to the internal power source (e.g., power source 106, as described in connection with FIGS. 1A-1C). In some implementations, the card may further include a transformer (or similar circuits) 404 configured to manage a flow of direct current into the internal power source (e.g., to prevent over-charging the internal power source). In some implementations, as described in connection with FIGS. 1A-1C, the port 402 may additionally, or alternatively, be configured to transfer electrical commands from the card to an external audio generator.

As shown in FIG. 4B, a motion device 452 may be mounted on a corner (or another edge) of the substrate 102. For example, the motion device 452 may include a wheel that spins around an axle, a spring-loaded weight that moves up-and-down, or another type of moving object mounted to the card. Additionally, the motion device 452 may transfer kinetic energy (e.g., associated with the wheel rotating or the spring-loaded weight moving) to a generator (or similar circuits) 454 for transformation into electrical energy. Accordingly, a user of the card may use the motion device 452 to charge an internal power source of the card (e.g., power source 106, as described in connection with FIGS. 1A-1C). Although shown as mounted at the corner of the substrate 102, the motion device 452 may be mounted elsewhere on the substrate 102. For example, the motion device 452 may include a spring-loaded weight or a sliding mechanism that is mounted on an edge surface of the substrate 102 for moving up and down.

As indicated above, FIGS. 4A-4B are provided as examples. Other examples may differ from what is described with regard to FIGS. 4A-4B.

Figure 5:
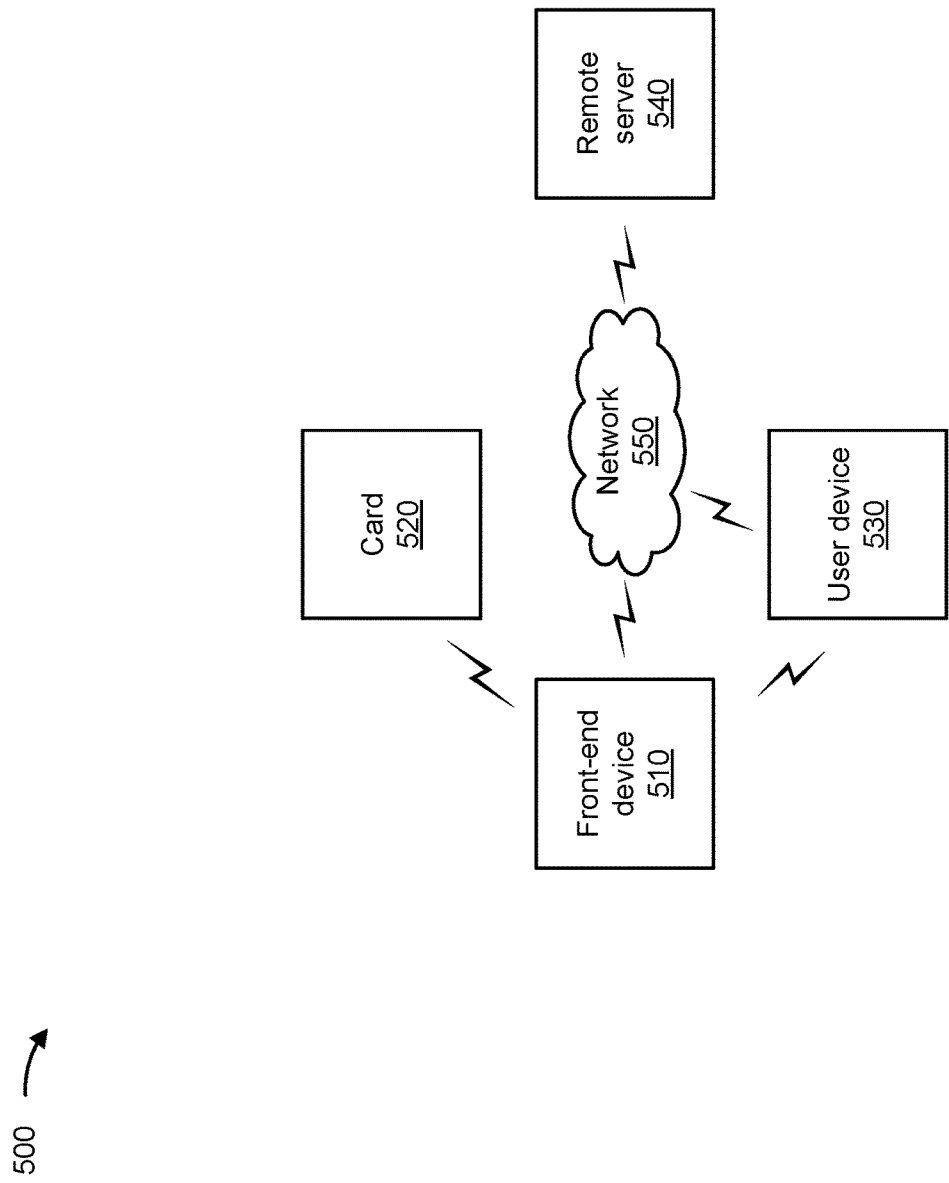
FIG. 5 is a diagram of an example environment in which systems and/or methods described herein may be implemented, in accordance with some implementations of the present disclosure.

FIG. 5 is a diagram of an example environment 500 in which systems and/or methods described herein may be implemented. As shown in FIG. 5, environment 500 may include a front-end device 510, a card 520, a user device 530, a remote server 540, and/or a network 550. Devices of environment 500 may interconnect via wired connections and/or wireless connections.

The front-end device 510 may include one or more devices capable of facilitating an electronic transaction associated with the card 520. For example, the front-end device 510 may include a PoS terminal, a payment terminal (e.g., a credit card terminal, a contactless payment terminal, a mobile credit card reader, or a chip reader), and/or an ATM. In some implementations, the front-end device 510 may include an access control terminal (e.g., used to control physical access to a secure area), such as an access control panel used to control an access-controlled entry (e.g., a turnstile, a door, a gate, or another physical barrier). The front-end device 510 may include one or more input components and/or one or more output components to facilitate obtaining data (e.g., account information) from the card 520 and/or to facilitate interaction with and/or authorization from an owner or accountholder of the card 520. Example input components of the front-end device 510 include a number keypad, a touchscreen, a magnetic stripe reader, a chip reader, and/or an RF signal reader (e.g., a near-field communication (NFC) reader). Example output devices of front-end device 510 include a display and/or a speaker.

The card 520 may include one or more devices capable of being used for an electronic transaction. In some implementations, the card 520 may include a transaction card (or another physical medium with integrated circuitry) capable of storing and communicating account information, such as a credit card, a debit card, a gift card, an ATM card, a transit card, a fare card, and/or an access card.

The card 520 may store account information associated with the card 520, which may be used in connection with an electronic transaction facilitated by the front-end device 510. The account information may include, for example, an account identifier that identifies an account (e.g., a bank account or a credit account) associated with the card 520 (e.g., an account number, a card number, a bank routing number, and/or a bank identifier), a cardholder identifier (e.g., identifying a name of a person, business, or entity associated with the account or the card 520), expiration information (e.g., identifying an expiration month and/or an expiration year associated with the card 520), and/or a credential (e.g., a payment token). In some implementations, the card 520 may store the account information in tamper-resistant memory of the card 520, such as in a secure element. As part of performing an electronic transaction, the card 520 may transmit the account information to the front-end device 510 using a communication component, such as a magnetic stripe, an IC chip (e.g., a EUROPAY®, MASTERCARD®, VISA® (EMV) chip), and/or a contactless communication component (e.g., an NFC component, an RF component, a Bluetooth® component, and/or a Bluetooth® Low Energy (BLE) component). Thus, the card 520 and the front-end device 510 may communicate with one another by coming into contact with one another (e.g., using a magnetic stripe or an EMV chip) or via contactless communication (e.g., using NFC).

The user device 530 may include one or more devices capable of being used for an electronic transaction, as described above in connection with the card 520. The user device 530 may include a communication device and/or a computing device. For example, the user device 530 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 530 may be capable of receiving, generating, storing, processing, and/or providing information associated with indicating a correct contact or a correct sequence of contacts in order to activate the card 520, as described elsewhere herein.

The remote server 540 may include one or more devices capable of processing, authorizing, and/or facilitating a transaction. For example, the remote server 540 may include one or more servers and/or computing hardware (e.g., in a cloud computing environment or separate from a cloud computing environment) configured to receive and/or store information associated with processing an electronic transaction. The remote server 540 may process a transaction, such as to approve (e.g., permit, authorize, or the like) or decline (e.g., reject, deny, or the like) the transaction and/or to complete the transaction if the transaction is approved. The remote server 540 may process the transaction based on information received from the front-end device 510, such as transaction data (e.g., information that identifies a transaction amount, a merchant, a time of a transaction, a location of the transaction, or the like), account information communicated to the front-end device 510 by the card 520, and/or information stored by the remote server 540 (e.g., for fraud detection).

The remote server 540 may be associated with a financial institution (e.g., a bank, a lender, a credit card company, or a credit union) and/or may be associated with a transaction card association that authorizes a transaction and/or facilitates a transfer of funds. For example, the remote server 540 may be associated with an issuing bank associated with the card 520, an acquiring bank (or merchant bank) associated with the merchant and/or the front-end device 510, and/or a transaction card association (e.g., VISA® or MASTER-CARD®) associated with the card 520. Based on receiving information associated with the card 520 from the front-end device 510, one or more devices of the remote server 540 may communicate to authorize a transaction and/or to transfer funds from an account associated with the card 520 to an account of an entity (e.g., a merchant) associated with the front-end device 510.

The network 550 may include one or more wired and/or wireless networks. For example, the network 550 may include a cellular network, a public land mobile network, a local area network, a wide area network, a metropolitan area network, a telephone network, a private network, the Internet, and/or a combination of these or other types of networks. The network 550 enables communication among the devices of environment 500. In some implementations, the front-end device 510 may communicate with the card 520 using a first network (e.g., a contactless network or by coming into contact with the card 520) and may communicate with the remote server 540 using a second network.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
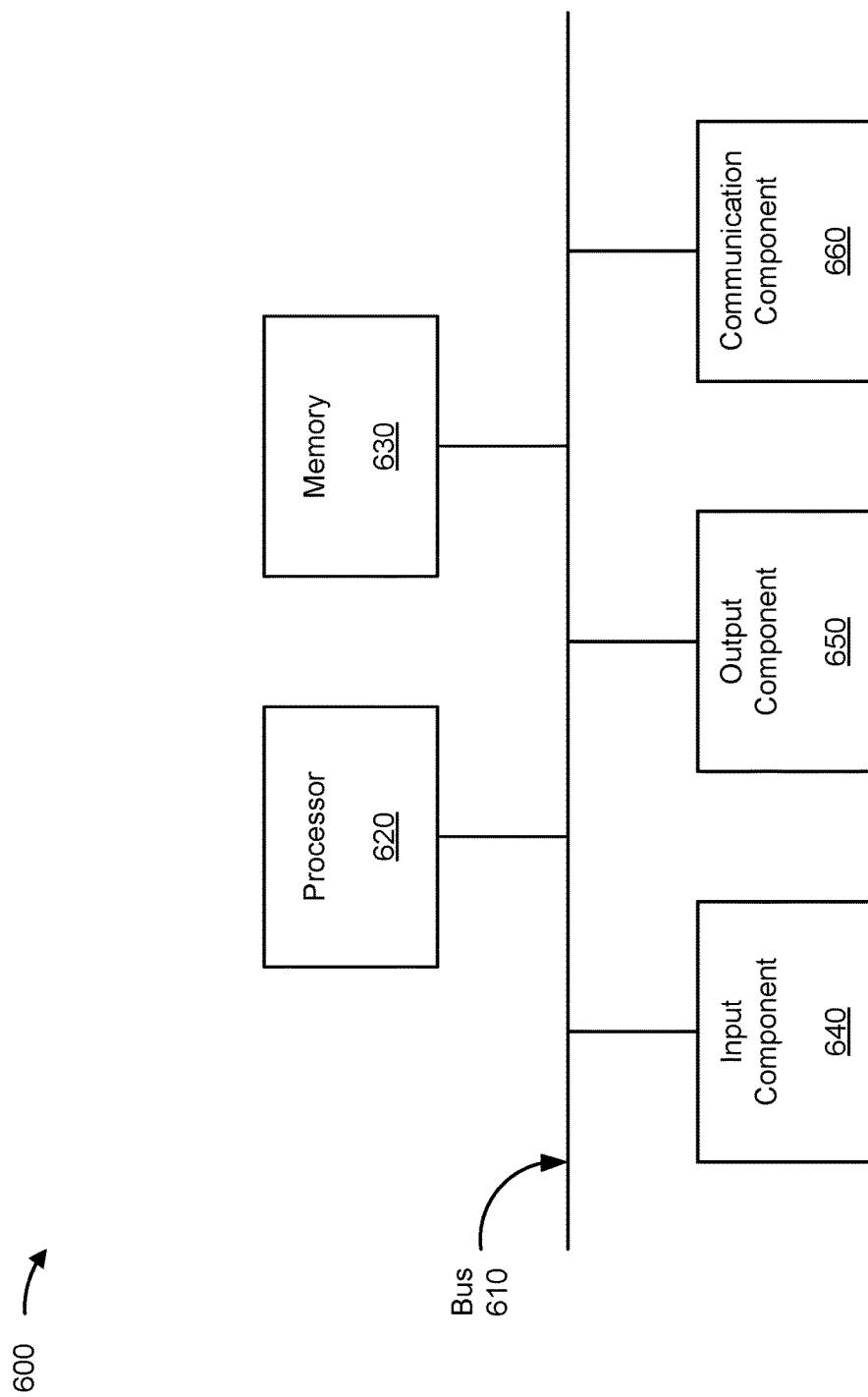
FIG. 6 is a diagram of example components of one or more devices of FIG. 5, in accordance with some implementations of the present disclosure.

FIG. 6 is a diagram of example components of a device 600, which may correspond to a front-end device, a user device, a remote server, and/or circuitry of a card. In some implementations, a front-end device, a user device, and/or a remote server may include one or more devices 600 and/or one or more components of device 600. As shown in FIG. 6, device 600 may include a bus 610, a processor 620, a memory 630, an input component 640, an output component 650, and a communication component 660.

Bus 610 may include one or more components that enable wired and/or wireless communication among the components of device 600. Bus 610 may couple together two or more components of FIG. 6, such as via operative coupling, communicative coupling, electronic coupling, and/or electric coupling. Processor 620 may include a central processing unit, a graphics processing unit, a microprocessor, a controller, a microcontroller, a digital signal processor, a field-programmable gate array, an application-specific integrated circuit, and/or another type of processing component. Processor 620 may be implemented in hardware, firmware, or a combination of hardware and software. In some implementations, processor 620 may include one or more processors capable of being programmed to perform one or more operations or processes described elsewhere herein.

Memory 630 may include volatile and/or nonvolatile memory. For example, memory 630 may include random access memory (RANI), ROM, a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 may include one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
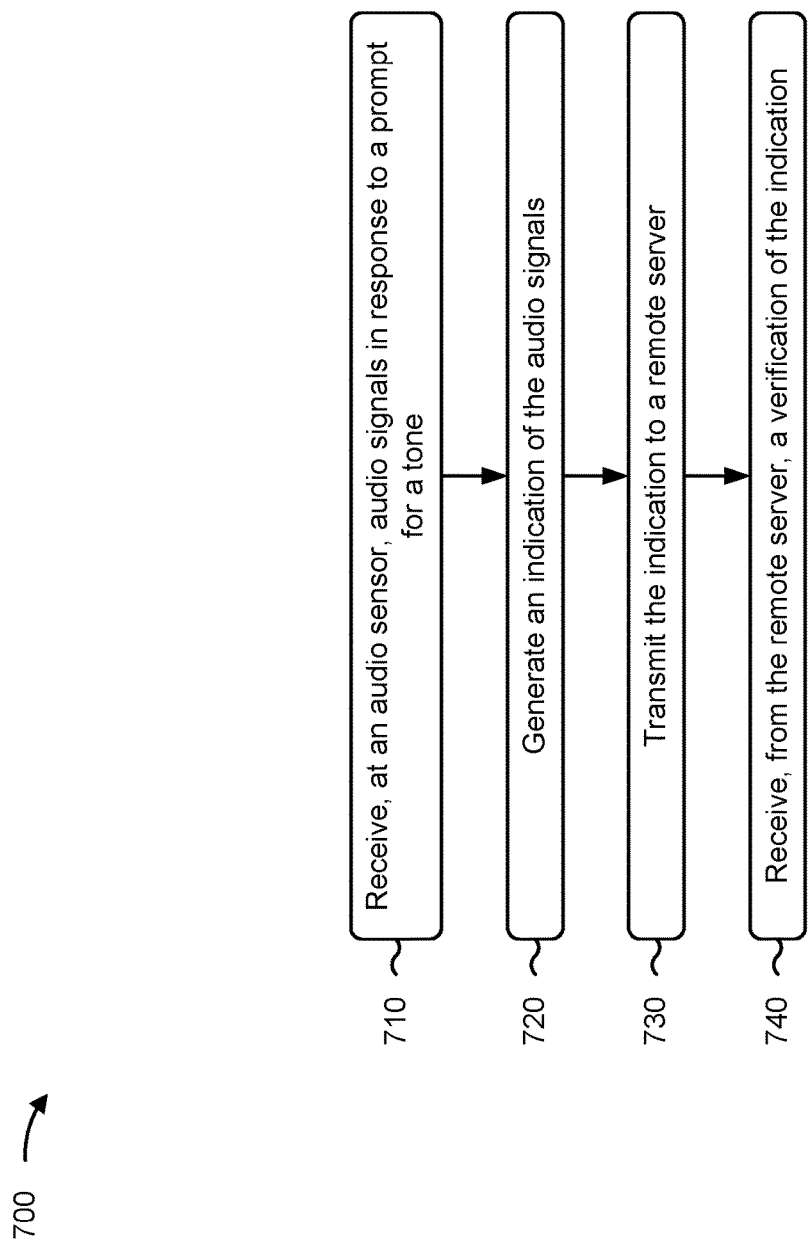
FIG. 7 is a flowchart of an example process relating to verifying a physical card using a tone, in accordance with some implementations of the present disclosure.

FIG. 7 is a flowchart of an example process 700 associated with tone verification of a physical card. In some implementations, one or more process blocks of FIG. 7 may be performed by the front-end device 510. Additionally, or alternatively, one or more process blocks of FIG. 7 may be performed by one or more components of the device 600, such as processor 620, memory 630, input component 640, output component 650, and/or communication component 660.

As shown in FIG. 7, process 700 may include receiving, at an audio sensor, audio signals in response to a prompt for a tone (block 710). For example, the front-end device 510 (e.g., using processor 620, memory 630, input component 640, and/or communication component 660) may receive, at an audio sensor, audio signals in response to a prompt for a tone, as described above in connection with reference number 112 of FIG. 1A. As an example, the front-end device 510 may receive (e.g., via a microphone and/or another type of audio sensor) and record (e.g., in an analog and/or digital format) the audio signals. As described in connection with FIG. 2A, the prompt may include initial audio signals (e.g., voice instructions) generated by a speaker (or another type of audio generator) of the front-end device 510.

As further shown in FIG. 7, process 700 may include generating an indication of the audio signals (block 720). For example, the front-end device 510 (e.g., using processor 620 and/or memory 630) may generate an indication of the audio signals, as described above in connection with reference number 202 of FIG. 2A. As an example, the indication may include a file for transmission to the remote server or may include an indication of one or more properties based on the audio signals.

As further shown in FIG. 7, process 700 may include transmitting the indication to a remote server (block 730). For example, the front-end device 510 (e.g., using processor 620, memory 630, and/or communication component 660) may transmit the indication to a remote server, as described above in connection with reference number 204 of FIG. 2A. As an example, the front-end device 510 may transmit the file encoding the audio signals or a message (e.g., one or more packets) encoding the indication of the one or more properties.

As further shown in FIG. 7, process 700 may include receiving, from the remote server, a verification of the indication (block 740). For example, the front-end device 510 (e.g., using processor 620, memory 630, input component 640, and/or communication component 660) may receive, from the remote server, a verification of the indication, as described above in connection with reference number 206a of FIG. 2B. As an example, the verification may indicate that the recorded audio signals match (within a margin of error) a stored digital representation of audio signals in a database of digital representations of audio signals linked to identifications of physical cards.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1C, 2A-2B, and/or 3A-3B. Moreover, while the process 700 has been described in relation to the devices and components of the preceding figures, the process 700 can be performed using alternative, additional, or fewer devices and/or components. Thus, the process 700 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A card for communicating with a front-end device, the card comprising:
   a substrate;
   an audio generator at least partially embedded in the substrate and configured to generate audio waves;
   a contact at least partially embedded in the substrate and configured to activate the audio generator; and
   circuitry configured to process an incoming signal from the contact and to transmit an outgoing signal to the audio generator,
      wherein the circuitry is further configured to be reprogrammed, through the contact and via a contact pad of another device, with a new threshold value of a current or a voltage across the contact,
      wherein the circuitry is further configured to generate, based on the new threshold value being satisfied, code that is executable by the circuitry to generate the outgoing signal, and
      wherein the audio generator generates a sequence of tones based on the outgoing signal.

2. The card of claim 1, further comprising:
   an internal power source at least partially embedded in the substrate and connected to the circuitry and to the audio generator.

3. The card of claim 2, further comprising:
   a port at least partially embedded on an edge of the substrate and configured to transfer electricity from an external power source to the internal power source.

4. The card of claim 1, wherein the circuitry includes a non-transitory storage with code, executable by the circuitry, to instruct the audio generator to generate a sequence of tones.

5. The card of claim 1, further comprising:
   a communication device at least partially embedded in the substrate and configured to receive an indication of a sequence of tones,
      wherein the circuitry includes a non-transitory storage with code, executable by the circuitry, to instruct the audio generator to generate the sequence of tones.

6. The card of claim 1, wherein the audio generator is configured to generate a sequence of tones that are supersonic or subsonic.

7. The card of claim 1, wherein the audio generator is configured to generate a sequence of tones that are within a human hearing range.

8. The card of claim 1, wherein the contact comprises a switch that is activatable by pressure.

9. A method of configuring a tone for a card to use with a front-end device, comprising:
   receiving, from a user device, an indication associated with a sequence of tones;
   reprogramming, via communication between a contact pad of another device and a contact of the card at least partially embedded in a substrate of the card, a circuitry of the card with a new threshold value of a current or a voltage across the contact;
   generating, based on the new threshold value being satisfied, code that is executed by the circuitry to instruct an audio generator device, at least partially embedded in the substrate of the card, to generate the sequence of tones;
   transmitting, to a communication device, the code for storing on a non-transitory storage medium at least partially embedded with a substrate of a card,
      wherein the code is transmitted from the communication device to the non-transitory storage medium.

10. The method of claim 9, further comprising:
    receiving, from the user device, an indication associated with an updated sequence of tones;
    generating updated code to instruct the audio generator to generate the updated sequence of tones; and
    transmitting, to an additional communication device, the code for storing on the non-transitory storage.

11. The method of claim 9, wherein generating the code comprises:
  generating a sequence of low-level instructions based on a configuration of the circuitry and a model of the audio generator.

12. The method of claim 9, wherein generating the code comprises:
  generating a sequence of high-level instructions for compiling by the communication device.

13. The method of claim 9, wherein the communication device comprises a device with a wired connection to the circuitry.

14. The method of claim 9, wherein the communication device comprises a device with a wireless connection to a receiver in communication with the circuitry.

15. A non-transitory computer-readable medium storing a set of instructions for verifying a tone from a card, the set of instructions comprising:
  one or more instructions that, when executed by one or more processors of a front-end device, cause the front-end device to:
    reprogram, via a contact pad of the front-end device and a contact at least partially embedded in a substrate of the card, a circuitry of a card device with a new threshold value of a current or a voltage across the contact;
    receive, from the card device and at an audio sensor of the front-end device, audio signals, corresponding to a sequence of tones, in response to a prompt for a tone,
      wherein the audio signals are generated by an audio generator at least partially embedded in the substrate and based on the new threshold value being satisfied;
    generate an indication of the audio signals;
    transmit the indication to a remote server; and
    receive, from the remote server, a verification of the indication.

16. The non-transitory computer-readable medium of claim 15, wherein the one or more instructions, when executed by the one or more processors, further cause the front-end device to:
  generate initial audio signals that encode the prompt for the tone.

17. The non-transitory computer-readable medium of claim 15, wherein the one or more instructions, that cause the front-end device to receive the audio signals, cause the front-end device to:
  begin recording the audio signals based on an amount of time after the prompt; and
  finish recording the audio signals based on an amount of time after beginning recording.

18. The non-transitory computer-readable medium of claim 15, wherein the one or more instructions, that cause the front-end device to receive the audio signals, cause the front-end device to:
  begin recording the audio signals based on an amount of time after the prompt; and
  finish recording the audio signals based on a signal that is associated with terminating recording.

19. The non-transitory computer-readable medium of claim 15, wherein the one or more instructions, that cause the front-end device to generate the indication of the audio signals, cause the front-end device to:
  encode the audio signals as a file for transmission to the remote server.

20. The non-transitory computer-readable medium of claim 15, wherein the one or more instructions, that cause the front-end device to generate the indication of the audio signals, cause the front-end device to:
  calculate one or more properties based on the audio signals; and
  generate one or more packets encoding an indication of the one or more properties for transmission to the remote server.

* * * * *